A. R. GIBSON.
ROASTING AND CORN POPPING MACHINE.
APPLICATION FILED JAN. 8, 1912. RENEWED JAN. 31, 1913.
1,055,736.
Patented Mar. 11, 1913.
2 SHEETS—SHEET 1.
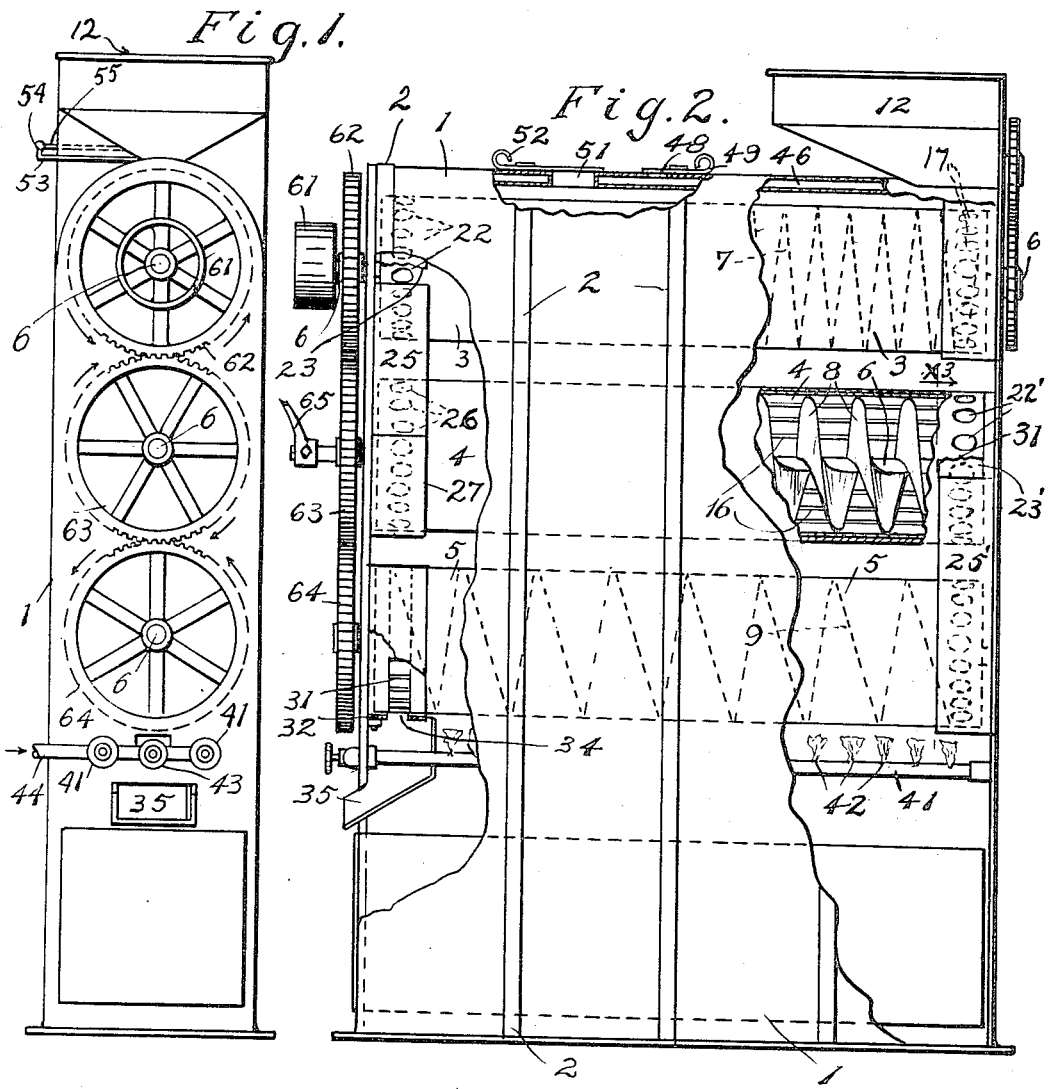
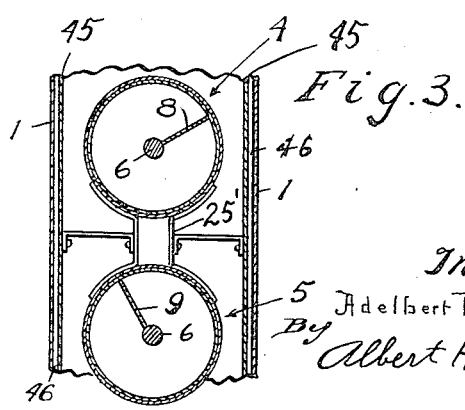
Witnesses:
H. H. Hunt,
Q. G. Bates.
Inventor:
Adelbert R. Gibson,
By Albert H. Merrill
Atty.

A. R. GIBSON.
ROASTING AND CORN POPPING MACHINE.
APPLICATION FILED JAN. 8, 1912. RENEWED JAN. 31, 1913.
1,055,736.
Patented Mar. 11, 1913.
2 SHEETS—SHEET 2.
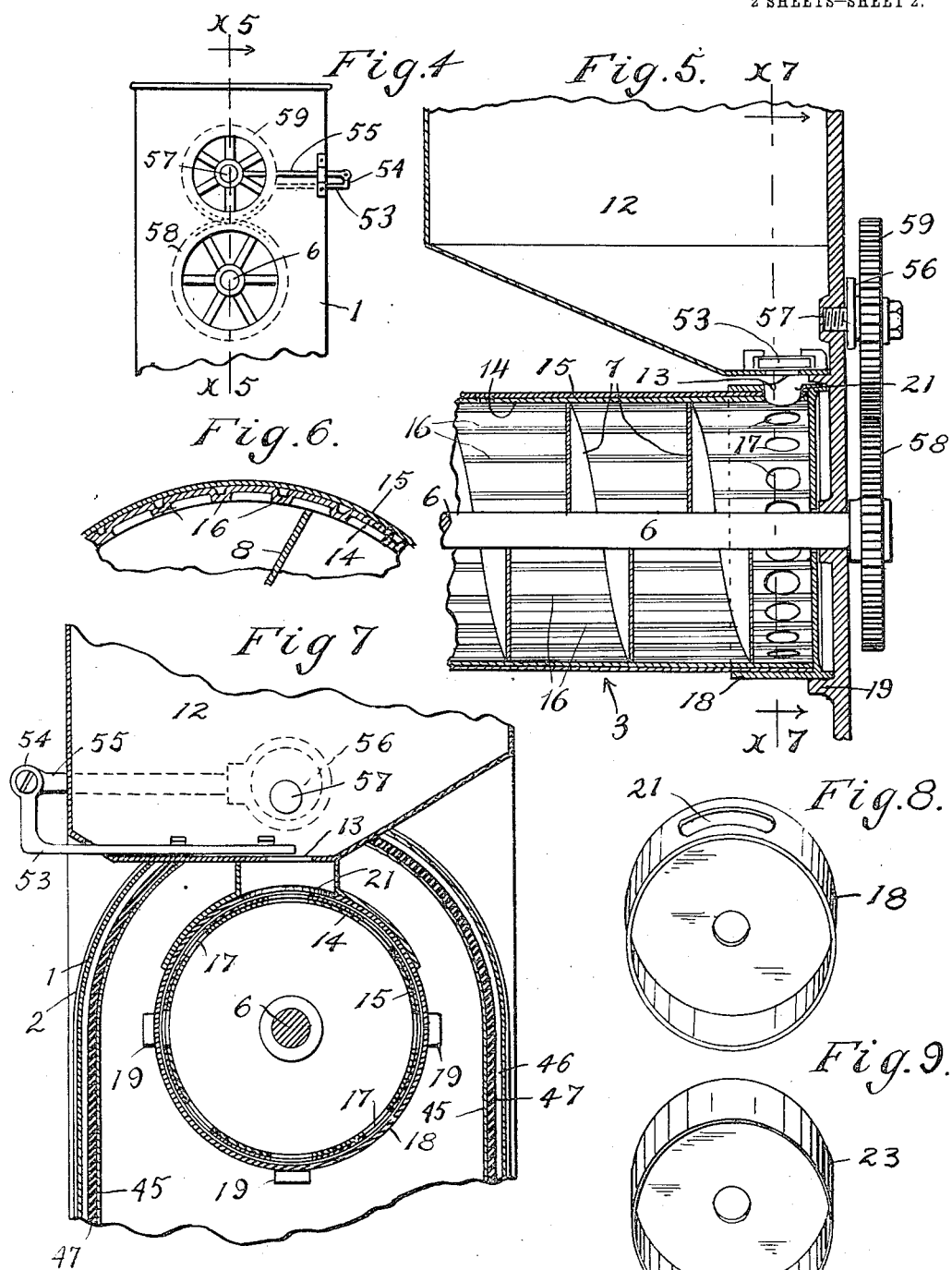
Witnesses:
H. H. Hunt,
P. G. Bates.
Inventor:
Adelbert R. Gibson,
By Albert H. Merrill
atty

UNITED STATES PATENT OFFICE.

ADELBERT R. GIBSON, OF LOS ANGELES, CALIFORNIA.

ROASTING AND CORN-POPPING MACHINE.

1,055,736. Specification of Letters Patent. Patented Mar. 11, 1913.

Application filed January 8, 1912, Serial No. 670,099. Renewed January 31, 1913. Serial No. 745,496.

*To all whom it may concern:*

Be it known that I, ADELBERT R. GIBSON, a citizen of the United States, residing in the city of Los Angeles, State of California, have invented a new and useful Roasting and Corn-Popping Machine, of which the following is a specification.

Among the objects of this invention are to provide a machine capable of receiving material in a continuous feed and discharging the same automatically after it has been popped or roasted, and also to provide for a more perfect cooking or roasting of the kernels of corn or other grain, and at the same time to guard against excessive heating of any portion of such kernel or grain.

The coffee berry, being flat on one side, will, unless properly turned, lie with that side down and be unevenly heated on account of the flat side only being in contact with the heated surface. But in a coffee roaster constructed according to the principles of this invention the coffee berries are forced to roll in such a manner as to become evenly roasted.

In the case of corn, to pop a kernel of that grain properly it is necessary to gradually heat it and it is also necessary to heat all surface portions alike before the corn is subjected to the heat required for popping. By doing that the corn is caused to burst from the point of greatest moisture, which is naturally the center of the kernel.

The machine is constructed to keep the material being treated in a constantly progressive movement so that, in the case of corn that is being popped, the kernels, after entering the machine at a point of low heat, are gradually propelled into a greater heat so that by the time they reach heat sufficient to pop them they are already so thoroughly heated through as to be in a perfect condition for popping under the action of the greatest heat provided.

A still further object is to provide a machine of greater capacity, such capacity being limited only by the size, the increase of capacity being in direct proportion to the increase of cylinder surface subjected to heat.

The foregoing objects are attained, and the features that have been enumerated are carried out, by the use of an improved rotary cylinder, preferably a plurality of such cylinders, said cylinder or cylinders being provided with means for keeping each individual grain revolving from the time it enters the machine until it has been thoroughly roasted or popped, as the case may be, and then discharged from the machine.

With the foregoing and other objects in view the invention consists of certain novel features of construction and combinations of parts which will be hereinafter more fully described, and then pointed out in the claims.

Referring to the accompanying drawings, which illustrate the preferred embodiment of the invention, Figure 1 is an end view of the complete machine; Fig. 2 is a side elevation thereof, parts being broken away to show interior construction; Fig. 3 is a cross section on line $x^3$ of Fig. 2; Fig. 4 is a broken end elevation of the upper portion of the machine looking at the end opposite that shown in Fig. 1; Fig. 5 is an enlarged vertical section of the hopper and a portion of the upper roasting cylinder; Fig. 6 is an enlarged broken cross section to illustrate the construction of the conveying cylinders; Fig. 7 is an enlarged section on line $x^7$ of Fig. 5; Fig. 8 is a perspective view of the cap which supports the end of the upper cylinder into which the material is fed; Fig. 9 is a perspective view of another supporting cap.

Referring in detail to the drawings, the upright casing 1 is provided with vertical reinforcing ribs 2. Within said casing are mounted a series of laterally extending superposed cylinders 3, 4 and 5. Each of said cylinders is supported by a rotary shaft 6 to which it is fixed. Said cylinders 3, 4 and 5 are also respectively provided with spiral conveyers 7, 8 and 9 which rotate with said cylinders. The spirals of the middle conveyer 8 are farther apart than those of the upper conveyer 7, and the spirals of the lowest conveyer 9 are still farther apart.

The corn to be popped or material to be roasted may be conveyed into a feed hopper 12 mounted on the top of the machine at one end thereof. From said hopper the material descends through a feed opening 13 into the intake end of the upper cylinder 3. Said cylinder 3, like the other cylinders 4 and 5, is formed with a longitudinally corrugated inner wall 14 and a smooth outer wall 15. These two walls are fitted tightly together to rotate as a single part. The corrugations 16 (see Fig. 6) of the inner wall are provided to prevent the kernels of corn or grains of material from sliding along the inner surfaces of the cylinders during their rotation, which would cause excessive heating on one side of the kernels or grains. Said corrugations 16 cause the particles of material to be repeatedly turned completely over as they are raised by the rotation of the cylinders and allowed to fall again.

The intake end of upper cylinder 3 has formed therearound a series of feed openings 17. Over said series of openings is loosely fitted a non-rotatable supporting cap 18 made fast to lugs 19 carried by the casing (see Fig. 5). Said cap 18 has a feed opening 21 through the upper portion thereof.

At the discharge end of cylinder 3 the same is likewise provided with a series of discharge apertures 22, said apertures being covered, and that end of said cylinder being supported by a stationary cap 23. The aperture 24 in the lower portion of said cap discharges into a chute or guiding element 25 whereby said material is conducted to the intake end of the next lower cylinder 4. Said cylinder 4 has a series of intake openings 26. A cap 27 supports that end of cylinder 4.

From the discharge end of cylinder 4 the material passes through openings 22', cap 23' and chute 25' into the intake end of the lowest cylinder 5. From said cylinder 5 the material is discharged through the cage-like head 31 which forms a part of said cylinder 5. Said head 31 is inclosed by a stationary supporting cap 32 having a discharge aperture 34 to discharge the material into the discharge spout 35, after it has been completely roasted or popped.

In the illustrated embodiment of the invention the three roasting cylinders 3, 4 and 5 are all heated from two burner pipes 41 located beneath the lowest cylinder 5. Said burner pipes have burner apertures 42 which, when lighted will produce sufficient heat to pop corn within the lowest cylinder 5, the corn having first been properly roasted during its gradual advance through the upper cylinders which, being farther from the burner, are heated to a less degree than the lowest cylinder.

43 designates the pilot burner and 44 the feed pipe.

In order to keep the material from clogging while it is being fed through the feed opening 13 in the bottom of the hopper 12, a stirring arm 53 is caused to reciprocate across said feed opening. Said arm has an offset end portion 54 which is pivotally connected with crank arm 55 driven by eccentric 56 fixed to stub shaft 57. Said stub shaft 57 is driven from upper shaft 6 by gears 58 and 59.

The machine may be operated by pulley 61 and gears 62, 63 and 64 to cause all of the cylinders to rotate together. The machine may, when desired, be operated by a hand crank 65 fastened to the middle shaft.

To prevent waste of heat an inner casing 45 may be placed within the outer casing 1, said casings being separated by an air space 46. Next to said inner casing 45 is an asbestos lining 47, said lining occupying only the inner portion of the air space 46.

In the top of the outer casing 1 is a vent 48 controlled by a damper 49 to permit the hot air to escape from said air space 46. There is also a vent 51, controlled by a damper 52, through both casings to afford a draft for the burner.

The corrugations 16 cause the particles of material to be rotated in one direction (the same direction that the cylinder revolves) while the action of the blades of the spiral conveyers serves to rotate said particles coming in contact therewith in a direction at right angles to the movement already described.

The material enters the machine from the hopper 12 at the intake end of the upper cylinder, said cylinder being located at the point of least heat because it is farthest from the burner 41. As said material is propelled through the machine the roasting is gradually performed until the material reaches a position in the last cylinder where the roasting is completed, or where in the case of corn to be popped, the kernels are fully ready for popping and will all be popped by the time they reach the discharge end of the last cylinder.

In the embodiment of the invention illustrated in the drawings, the conveying cylinders are all geared to rotate at the same speed, but the spirals 7, 8 and 9 are so spaced as to cause the material to move slowest where the heat is least and fastest where the heat is greatest.

I claim:

1. A cylinder provided with longitudinally extending corrugations, means to feed material to and discharge the same from said cylinder, means to heat said cylinder, a spiral conveyer within said cylinder, and means to rotate said cylinder.

2. A cylinder provided with an inside wall having longitudinally extending corrugations and an outer wall or casing inclosing said inside wall, means to rotate both walls of said cylinder as one part, a non-rotatable cap having a working fit over one end of said cylinder, said cap supporting that end of said cylinder, means to support said cap, means to heat said cylinder, means to feed material to said cylinder, and means to discharge material from said cylinder.

3. A rotary laterally extending cylinder having a series of openings extending through the side thereof, means to rotate said cylinder, an external member forming a closure to prevent material falling out of said cylinder through said openings, said member having a feed opening through the upper portion thereof, means to feed material to and discharge the same from said cylinder, and means to heat material within said cylinder while the same is being propelled through said cylinder.

4. A rotary laterally extending cylinder having a series of feed openings therearound near one end thereof, a supporting cap within which that end of said cylinder revolubly fits, said cap forming a closure to prevent material dropping out of said cylinder through said series of openings, said cap having a feed opening through the upper portion thereof with which the openings of said series of openings successively register, and means to rotate said cylinder.

5. A rotary laterally extending cylinder having an intake end and a discharge end, said discharge end having a series of discharge openings therearound, a supporting cap within which said discharge end of the cylinder revolubly fits, said cap having a discharge opening through the lower portion thereof into register with which said openings of the cylinder successively come, and means to rotate said cylinder.

6. A plurality of superposed laterally extending rotary cylinders, each of said cylinders having an intake end and a discharge end, the discharge end of a cylinder being above the intake end of a cylinder next below, there being a series of discharge openings around said discharge end and a series of intake openings around said intake end, means to conduct material from said discharge openings to said intake openings, and means to rotate said cylinders.

7. A rotary roasting or popping cylinder, said cylinder having an intake end and a discharge end, said cylinder carrying at its discharge end a head having longitudinally extending bars with open spaces between them to provide free exit for corn after the same has been popped, means for heating said cylinder, and means to rotate said cylinder.

8. A revoluble shaft, a roasting or popping cylinder mounted in fixed relation to said shaft which extends longitudinally therethrough, a spiral conveyer within said cylinder, means to feed material to and discharge the same from said cylinder, and means to rotate said shaft.

In testimony whereof I have hereunto signed my name in the presence of two subscribing witnesses at Los Angeles, in the county of Los Angeles and State of California, this second day of January 1912.

ADELBERT R. GIBSON.

Witnesses:
ALBERT H. MERRILL,
LILLIAN YOUNG.